US008923410B2

(12) United States Patent
Hamanaka

(10) Patent No.: US 8,923,410 B2
(45) Date of Patent: Dec. 30, 2014

(54) INFORMATION TRANSMISSION APPARATUS AND INFORMATION TRANSMISSION METHOD

(75) Inventor: Akiyoshi Hamanaka, Hachioji (JP)

(73) Assignee: Canon Kabushiki Kaisha, Tokyo (JP)

(*) Notice: Subject to any disclaimer, the term of this patent is extended or adjusted under 35 U.S.C. 154(b) by 1644 days.

(21) Appl. No.: 11/689,338

(22) Filed: Mar. 21, 2007

(65) Prior Publication Data

US 2007/0286279 A1 Dec. 13, 2007

(30) Foreign Application Priority Data

Apr. 13, 2006 (JP) ................................ 2006-111360

(51) Int. Cl.
*H04N 11/02* (2006.01)
*H04N 21/2385* (2011.01)
*H04L 29/06* (2006.01)
*H04N 21/24* (2011.01)
*H04N 21/854* (2011.01)
*H04N 19/146* (2014.01)
*H04N 19/164* (2014.01)
*H04N 19/142* (2014.01)
*H04N 19/127* (2014.01)
*H04N 21/238* (2011.01)
*H04N 19/115* (2014.01)
*H04N 19/46* (2014.01)
*H04N 19/172* (2014.01)

(52) U.S. Cl.
CPC ...... *H04L 29/06027* (2013.01); *H04N 21/2385* (2013.01); *H04L 65/607* (2013.01); *H04N 21/2402* (2013.01); *H04N 21/85406* (2013.01); *H04N 19/00169* (2013.01); *H04N 19/00236* (2013.01); *H04N 19/00163* (2013.01); *H04N 19/00103* (2013.01); *H04N 21/238* (2013.01); *H04N 19/0006* (2013.01); *H04N 19/00545* (2013.01); *H04L 65/80* (2013.01); *H04N 19/00266* (2013.01); *H04L 65/602* (2013.01); *H04N 21/23805* (2013.01)
USPC .................................................... 375/240.26

(58) Field of Classification Search
USPC .................................................... 375/240.26
See application file for complete search history.

(56) References Cited

U.S. PATENT DOCUMENTS 5,473,569 A * 12/1995 Chwu ........................... 365/218
6,628,713 B1 * 9/2003 Kojima et al. ........... 375/240.16
(Continued)

FOREIGN PATENT DOCUMENTS

JP 02-254887 A 10/1990
JP 2-675130 B2 11/1997
(Continued)

*Primary Examiner* — Michael Pyzocha
(74) *Attorney, Agent, or Firm* — Canon USA, Inc., IP Division

(57) ABSTRACT

An information transmission apparatus that transmits data whose generation amount per unit time changes is provided. If a data amount that exceeds a predetermined threshold is generated, an excess data portion, which is a portion of a piece of data, the portion being of a data amount by which the piece of data exceeds the threshold, is distributed to at least a piece of preceding data whose data amount does not reach the threshold. The excess data portion is distributed at a ratio determined in accordance with a difference between the data amount of a piece of data to which the excess data portion is to be distributed and the threshold.

14 Claims, 11 Drawing Sheets

(56) References Cited

U.S. PATENT DOCUMENTS

| | | | |
|---|---|---|---|
| 2002/0173312 A1* | 11/2002 | Takano et al. | 455/452 |
| 2003/0152224 A1* | 8/2003 | Candelore et al. | 380/210 |
| 2004/0042453 A1* | 3/2004 | Jang et al. | 370/389 |
| 2004/0063406 A1* | 4/2004 | Petrus et al. | 455/67.11 |
| 2004/0184535 A1* | 9/2004 | Wang | 375/240.03 |
| 2006/0209947 A1* | 9/2006 | De Haan et al. | 375/240.01 |
| 2009/0034466 A1* | 2/2009 | Lindskog et al. | 370/329 |

FOREIGN PATENT DOCUMENTS

| | | | |
|---|---|---|---|
| JP | 11-055128 A | 2/1999 | |
| JP | 2001-203718 A | 7/2001 | |
| JP | 2003-009087 A | 1/2003 | |
| JP | 2005-191933 A | 7/2005 | |
| KR | 1998-0074045 A | 11/1998 | |
| KR | 10-1999-0058270 A | 7/1999 | |
| WO | WO 2004110069 A1 * | 12/2004 | H04N 7/26 |

* cited by examiner

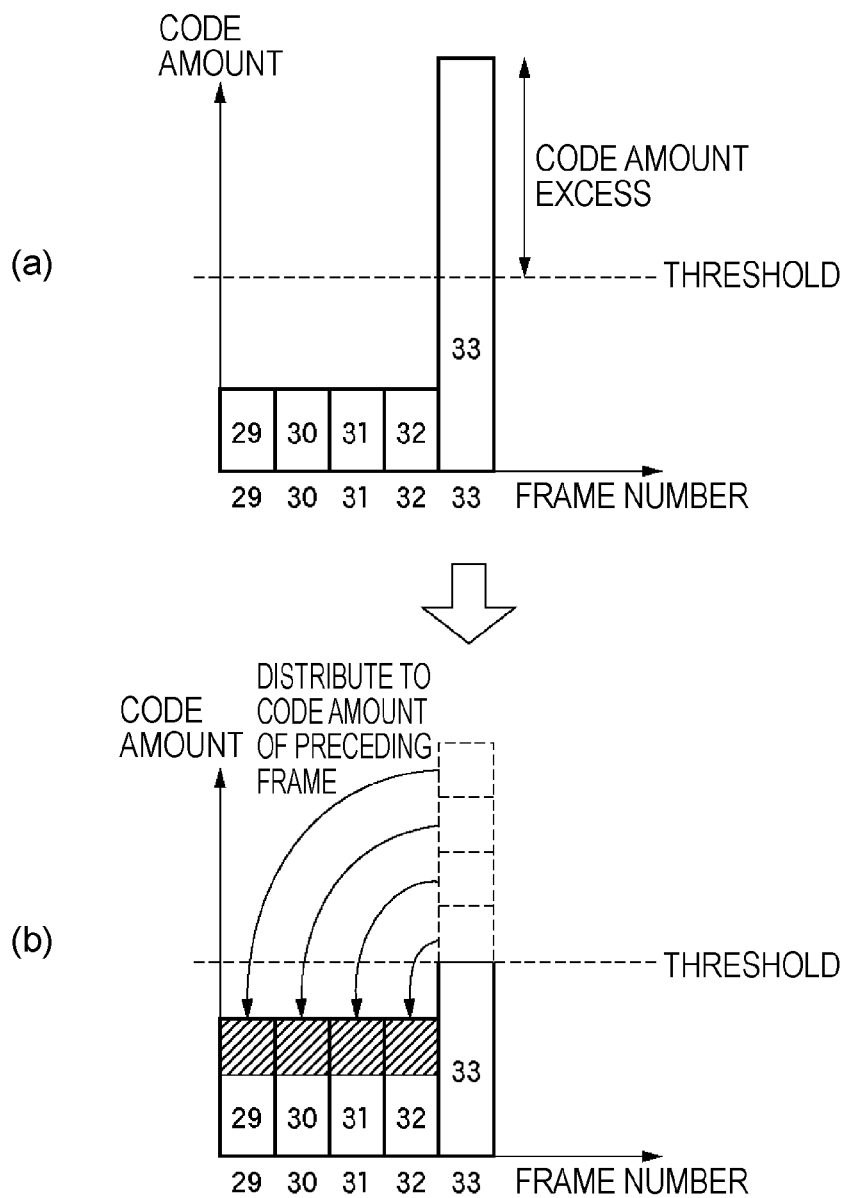

FIG. 6

| | | | | | | | |
|---|---|---|---|---|---|---|---|
| ftyp | | | | | * | 4.3 | file type and compatibility |
| moov | | | | | * | 8.1 | container for all the meta-data |
| | mvhd | | | | * | 8.3 | movie header, overall declarations |
| | trak | | | | * | 8.4 | container for an individual track or stream |
| | | tkhd | | | * | 8.5 | track header, overall information about the track |
| | | tref | | | | 8.6 | track reference container |
| | | edts | | | | 8.25 | edit list container |
| | | | elst | | | 8.26 | an edit list |
| | | mdia | | | * | 8.7 | container for the media information in a track |
| | | | mdhd | | * | 8.8 | media header, overall information about the media |
| | | | hdlr | | * | 8.9 | handler, declares the media (handler) type |
| | | | minf | | * | 8.10 | media information container |
| | | | | vmhd | | 8.11.2 | video media header, overall information (video track only) |
| | | | | smhd | | 8.11.3 | sound media header, overall information (sonud track only) |
| | | | | hmhd | | 8.11.4 | hint media header, overall information (hint track only) |
| | | | | dinf | * | 8.12 | data information box, container |
| | | | | | dref | * 8.13 | data reference box, declares source(s) of media data in track |
| | | | | stbl | * | 8.14 | sample table box, container for the time/space map |
| | | | | | stsd | * 8.16 | sample descriptions (codec types, initialization etc.) |
| | | | | | stts | * 8.15.2 | (decoding) time-to-sample |
| | | | | | ctts | 8.15.3 | (composition) time to sample |
| | | | | | stsc | * 8.18 | sample-to-chunk, partial data-offset information |
| | | | | | stsz | 8.17.2 | sample sizes (framing) |
| | | | | | stz2 | 8.17.3 | compact sample sizes (framing) |
| | | | | | stco | * 8.19 | chunk offset, partial data-offset information |
| | | | | | co64 | 8.19 | 64-bit chunk offset |
| | | | | | stss | 8.20 | sync sample table (random access points) |
| | | | | | stsh | 8.21 | shadow sync sample table |
| | | | | | padb | 8.23 | sample padding bits |
| | | | | | stdp | 8.22 | sample degradation priority |
| | mvex | | | | | 8.29 | movie extends box |
| | | trex | | | | * 8.30 | track extends defaults |
| moof | | | | | | 8.31 | movie fragment |
| | mfhd | | | | | * 8.32 | movie fragment header |
| | traf | | | | | 8.33 | track fragment |
| | | tfhd | | | | * 8.34 | track fragment header |
| | | trun | | | | 8.35 | track fragment run |
| mdat | | | | | | 8.2 | media data container |
| free | | | | | | 8.24 | free space |
| skip | | | | | | 8.24 | free space |
| | udta | | | | | 8.27 | user-data |
| | | cprt | | | | 8.28 | copyright etc. |

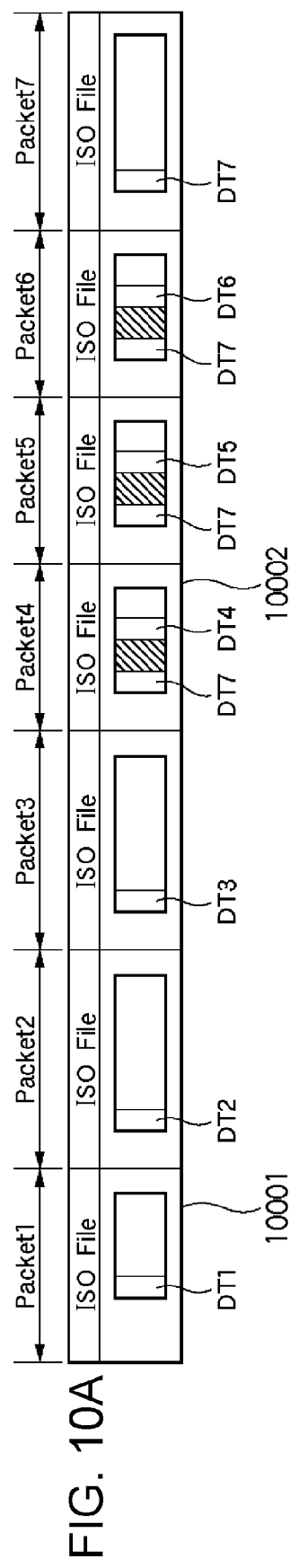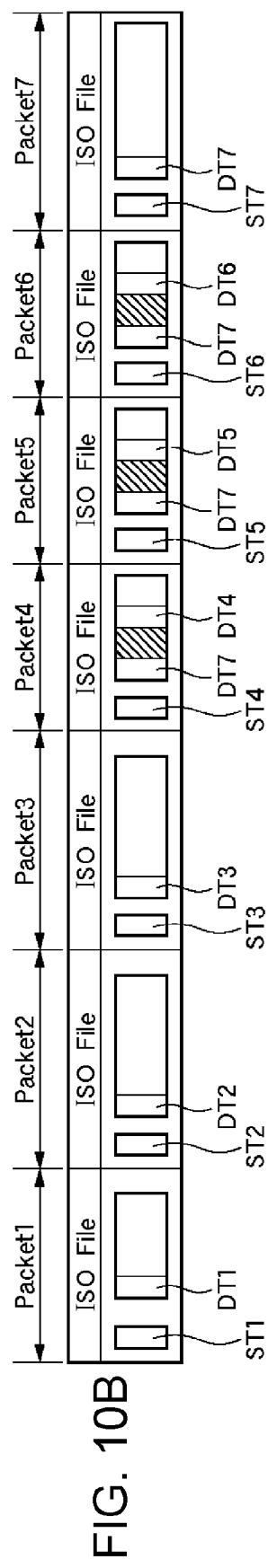

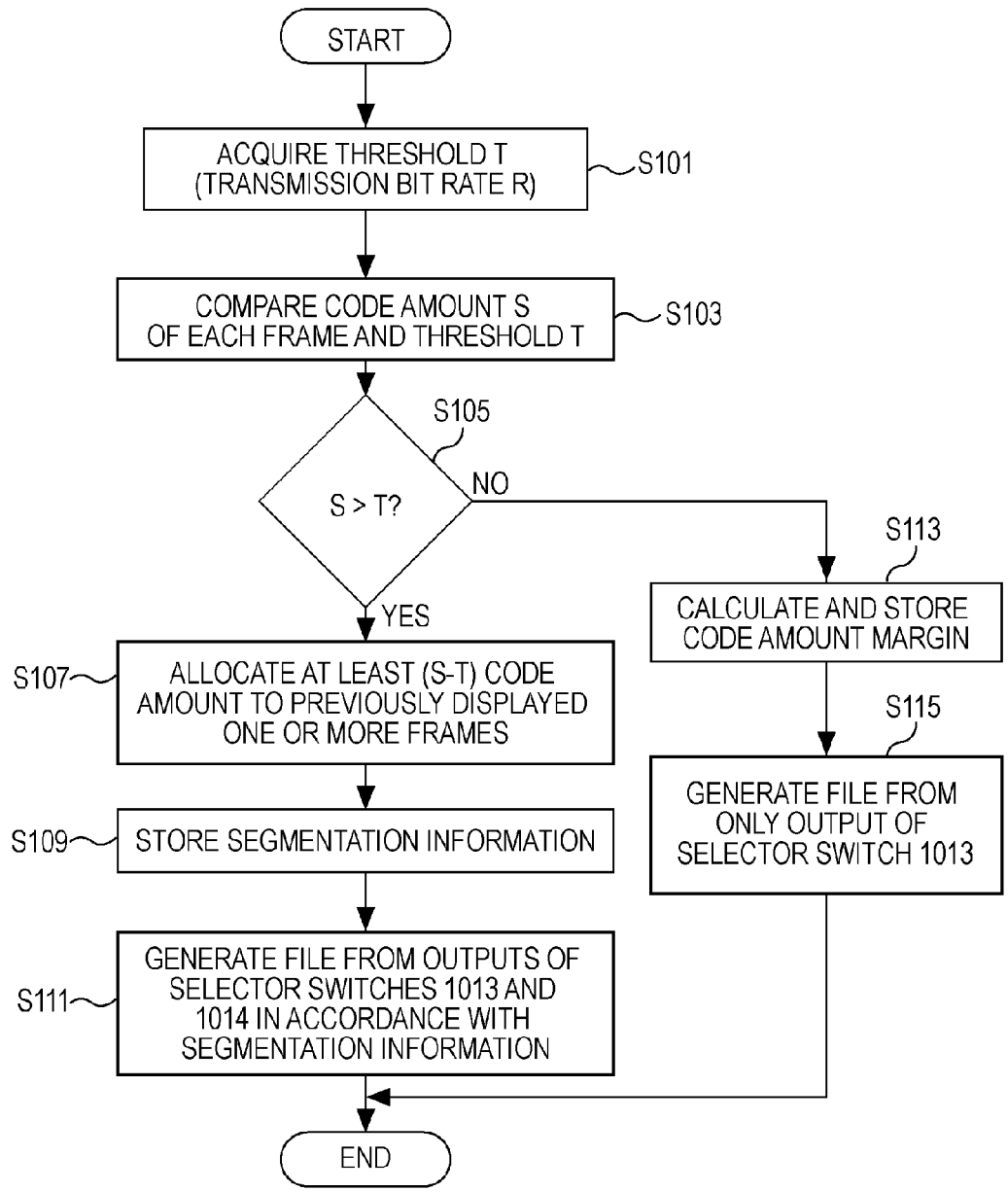

INFORMATION TRANSMISSION APPARATUS AND INFORMATION TRANSMISSION METHOD

BACKGROUND OF THE INVENTION

1. Field of the Invention

The present invention relates to information transmission apparatuses that transmit data and information transmission methods for transmitting data, where generation amount per unit time of the data changes, and more particularly, to an information transmission apparatus and an information transmission method that are capable of efficiently transmitting data.

2. Description of the Related Art

Data encoding efficiency greatly changes in accordance with a characteristic of data encoded and a characteristic of an encoding method used. It is not desirable to transmit to an apparatus an amount of encoded data that exceeds the capability of the apparatus. Thus, for example, a method for achieving reliable data transmission by controlling the quality of encoding processing to reduce the change of encoded data amount has been proposed.

For example, Japanese Patent No. 2675130 discloses an image data transfer apparatus. When each frame of an image is encoded, an excess data portion, which is a portion of a piece of encoded data, the portion being of a data amount by which the piece of encoded data exceeds a threshold, is multiplexed with encoded data of a temporally preceding frame whose code amount does not reach the threshold, and the obtained multiplexed encoded data is transmitted. The remaining encoded data, whose code amount does not exceed the threshold, is normally transmitted. Thus, a deterioration of image quality of a frame that has a large amount of encoded data can be suppressed, and the amount of data to be transmitted falls under the threshold.

FIG. 4 is a block diagram showing an example of a configuration of an image data transfer apparatus of the related art.

Analog original image data (moving image) received at an input terminal 4101 is converted into digital moving image data by an analog-to-digital (A/D) converter 4102, and the digital moving image data is stored in a frame memory 4103. The digital moving image data stored in the frame memory 4103 is read according to need and input to an encoder 4104.

The encoder 4104 encodes the received digital moving image data using a predetermined method. The encoder 4104 also generates a frame number for each encoded frame, and outputs the generated frame numbers to a switch (SW) 4108 and a main frame number generator 4112.

The encoded data is stored, for each frame, in one of memories 4109 to 4111 (memory numbers 1 to N) through the switch 4108. When the frame number of a frame encoded by the encoder 4104 is "X" and the remainder of X/N is "n", the switch 4108 is controlled such that the encoded data corresponding to the frame number X is stored in the memory whose memory number is n+1.

That is, if the frame number of the latest encoded frame to be currently stored in a memory is 33 (that is, X=33) and the total number of memories is 5 (that is, N=5), the value "4" is obtained from the equation n+1=4. Thus, the switch 4108 is controlled such that encoded data corresponding to the frame number 33 is stored in the memory 4.

When a memory that stores certain encoded data is selected in accordance with the above-mentioned rule, at a point in time when the encoded data whose frame number is 33 is stored in the memory 4, encoded data whose frame number is 32 is stored in the memory 3, encoded data whose frame number is 31 is stored in the memory 2, encoded data whose frame number is 30 is stored in the memory 1, and encoded data whose frame number is 29 is stored in the memory 5.

As described above, in accordance with the frame number X generated by the encoder 4104 for each encoded frame and the total number N of memories, the value obtained from n+1 is obtained. In accordance with the value obtained from n+1, the switch 4108 is controlled. Thus, encoded frames are sequentially stored in the memories 1 to N.

The frame number of the encoded frame that is read from one of the memories 1 to N and that is output to a multiplexer 4116 is represented by a main frame number Xnext output from the main frame number generator 4112.

An encoded frame corresponding to the main frame number Xnext corresponds to an encoded frame stored in the m+1th memory.

Here, "m" represents the remainder obtained by dividing the main frame number Xnext by N (the number of memories). In addition, the main frame number Xnext is represented by a difference between the current frame number X and a value obtained from N−1. Thus, when the frame number X is 33 and the number N of memories is 5, the main frame number Xnext is 29.

That is, a main frame is equal to the first stored (or oldest) encoded frame in one of the memories 1 to N.

A scene change frame number generation circuit 4115 compares the code amount of the current encoded frame that is encoded by the encoder 4104 and that is stored in one of the memories 1 to N (in this case, N=5) with a threshold, and detects a frame having a code amount that exceeds the threshold.

When detecting a frame having a code amount that exceeds the threshold, the scene change frame number generation circuit 4115 determines that the detected frame is a scene change frame. The frame number Xc of the detected frame is held in the scene change frame number generation circuit 4115 for a period of time corresponding to N frames (in this case, N=5). The scene change frame number Xc is also output to a selector switch 4114 and the multiplexer 4116.

The selector switch 4114 interprets the contents of a memory whose memory number is k+1 determined from the scene change frame number Xc as an encoded frame corresponding to a scene change frame. Then, the selector switch 4114 reads a desired portion of the contents of the memory whose memory number is k+1 from among the memories 1 to N.

Here, "k" represents the remainder obtained by dividing the scene change frame number Xc by the total number N of memories.

If the scene change frame number Xc is 33, as shown in part (a) of FIG. 5, an encoded frame corresponding to the frame number 33 is determined to be encoded data of a scene change frame. Thus, a portion of the contents of the memory 4 (that is, k+1=4), in which the encoded data is stored, is read in parallel to data of the encoded frame corresponding to the main frame number Xnext (that is, the contents of the memory 5).

The read contents of the memory 4 and the read contents of the memory 5 are multiplexed with each other by the multiplexer 4116, and are stored in a buffer memory 4105. The stored contents are sequentially read and input to a recorder 4106.

The multiplexed data input to the recorder 4106 is recorded on a recording medium 4107 under the control of the recorder 4106.

Segmentation of encoded data of a frame determined to be a scene change frame (scene change frame number Xc=33)

and multiplexing of the segmented encoded data with a main frame (main frame number Xnext=29) is performed (N−1) times after the scene change frame number generation circuit 4115 detects the scene change.

Thus, as shown in part (b) of FIG. 5, a portion of the encoded data corresponding to the frame number 33 (a portion of the contents of the memory 4) is also multiplexed with encoded data of other frames subsequent to the encoded data corresponding to the frame number 29 (the contents of the memory 5). More specifically, encoded data corresponding to the frame number 30 (the contents of the memory 1), encoded data corresponding to the frame number 31 (the contents of the memory 2), and encoded data corresponding to the frame number 32 (the contents of the memory 3) are also read at the same time, and are input to the multiplexer 4116.

The way in which a portion of encoded data of a scene change frame that is to be multiplexed with encoded data of another frame is determined is not particularly limited.

When the encoded data corresponding to the frame number 33, which is a scene change frame, is output as a main frame (corresponding to a main frame number Xnext), the remaining encoded data, which is data other than the portion multiplexed with the preceding frames and transmitted, is transmitted as encoded data of the main frame.

Such an image data transfer apparatus of the related art is provided to control the transmission data amount when recording onto a recording medium whose write data rate is fixed and stable is performed. Thus, an environment in which the quality of a transmission channel used for transmission of encoded data read from the buffer memory 4105 to the recorder 4106 dynamically changes is not assumed.

Thus, a threshold for detecting a scene change frame is fixed. This does not cause a big problem when the quality of the transmission channel is excellent. However, when the quality is deteriorated, overflow of the buffer memory 4105 may occur even if the encoded data amount does not reach the threshold.

An excess code amount is equally allocated to a plurality of preceding frames (see part (b) of FIG. 5). Thus, even if the encoded data amount of the preceding frame is small and multiplication of a larger amount of encoded data is possible, only multiplication of a fixed amount of encoded data is performed. Thus, the use efficiency of a transmission band cannot be maintained at a high level. In addition, if the encoded data amount of a frame to be multiplexed is close to the threshold, multiplexing may not be able to be performed.

As described above, it is difficult to apply a transmission control method of the related art to data transmission control of a communication apparatus that performs data transmission using a transmission channel whose transmission quality dynamically changes, such as a wireless communication line.

SUMMARY OF THE INVENTION

The present invention provides an information transmission apparatus and an information transmission method that are capable of efficiently transmitting data whose generation amount per time changes.

An information transmission apparatus according to an aspect of the present invention that transmits data whose generation amount per unit time changes includes a storage section configured to store a plurality of pieces of data as a plurality of memory data units, each of the plurality of pieces of data being generated in a unit time; a data amount control section configured to distribute an excess data portion, which is a portion of a memory data unit, the portion being of a data amount by which the memory data unit exceeds a predetermined threshold, to at least one of the plurality of memory data units stored in the storage section whose data amount does not reach the predetermined threshold; and a transmission section configured to transmit the plurality of pieces of data stored in the storage section. The data amount control section is configured to perform distribution in accordance with a distribution amount based on a difference between the data amount of the memory data unit to which the excess data portion is to be distributed and the predetermined threshold.

The apparatus may further include a detection section configured to detect the quality of a transmission channel through which the transmission section performs transmission; and a threshold determination section configured to calculate a data rate, as the predetermined threshold, at which communication can be performed through the transmission channel in accordance with the detected quality.

The apparatus may further include a request section configured to request an external apparatus that allocates a band of the transmission channel to allocate a band necessary for communication of a data amount corresponding to the predetermined threshold.

The transmission section may include a file generation section configured to convert each of the plurality of pieces of data, as memory data units, into an International Organization for Standardization file format and to store the converted file in a transmission buffer. The transmission section may be configured to read the file from the transmission buffer and to transmit the read file.

The file generation section may be configured to provide each of the memory data units with a transmission time.

The memory data units may be image data encoded in units of frames, slices, or macroblocks.

An information transmission method according to an aspect of the present invention for transmitting data whose generation amount per unit time changes includes the steps of storing a plurality of pieces of data as a plurality of memory data units in a storage section, each of the plurality of pieces of data being generated in a unit time; distributing an excess data portion, which is a portion of a memory data unit, the portion being of a data amount by which the memory data unit exceeds a predetermined threshold, to at least one of the plurality of memory data units stored in the storage section whose data amount does not reach the predetermined threshold; and transmitting the plurality of pieces of data stored in the storage section. Distribution is performed in accordance with a distribution amount based on a difference between the data amount of the memory data unit to which the excess data portion is to be distributed and the predetermined threshold.

A program according to an aspect of the present invention for causing a computer to perform an information transmission method for transmitting data whose generation amount per unit time changes includes the steps of storing a plurality of pieces of data as a plurality of memory data units in a storage section, each of the plurality of pieces of data being generated in a unit time; distributing an excess data portion, which is a portion of a memory data unit, the portion being of a data amount by which the memory data unit exceeds a predetermined threshold, to at least one of the plurality of memory data units stored in the storage section whose data amount does not reach the predetermined threshold; and transmitting the plurality of pieces of data stored in the storage section. Distribution is performed in accordance with a distribution amount based on a difference between the data amount of the memory data unit to which the excess data portion is to be distributed and the predetermined threshold.

Other objects, feature and advantages of the invention will become apparent from the following detailed description taken in conjunction with the accompanying drawings.

BRIEF DESCRIPTION OF THE DRAWINGS

FIG. 5 includes illustrations for explaining a method for segmentation and allocation of a frame whose has an excess code amount of the related art.

FIG. 6 shows a list of boxes defined by an ISO file format.

FIG. 11A schematically shows each encoded frame packetized into the ISO file format (fragment format), and FIG. 10B schematically shows a state in which a transmission time stamp is provided.

FIG. 11 is a flowchart of a file generation process performed by the image encoding and transmission apparatus according to the first embodiment.

DESCRIPTION OF THE EMBODIMENTS

Figure 1:
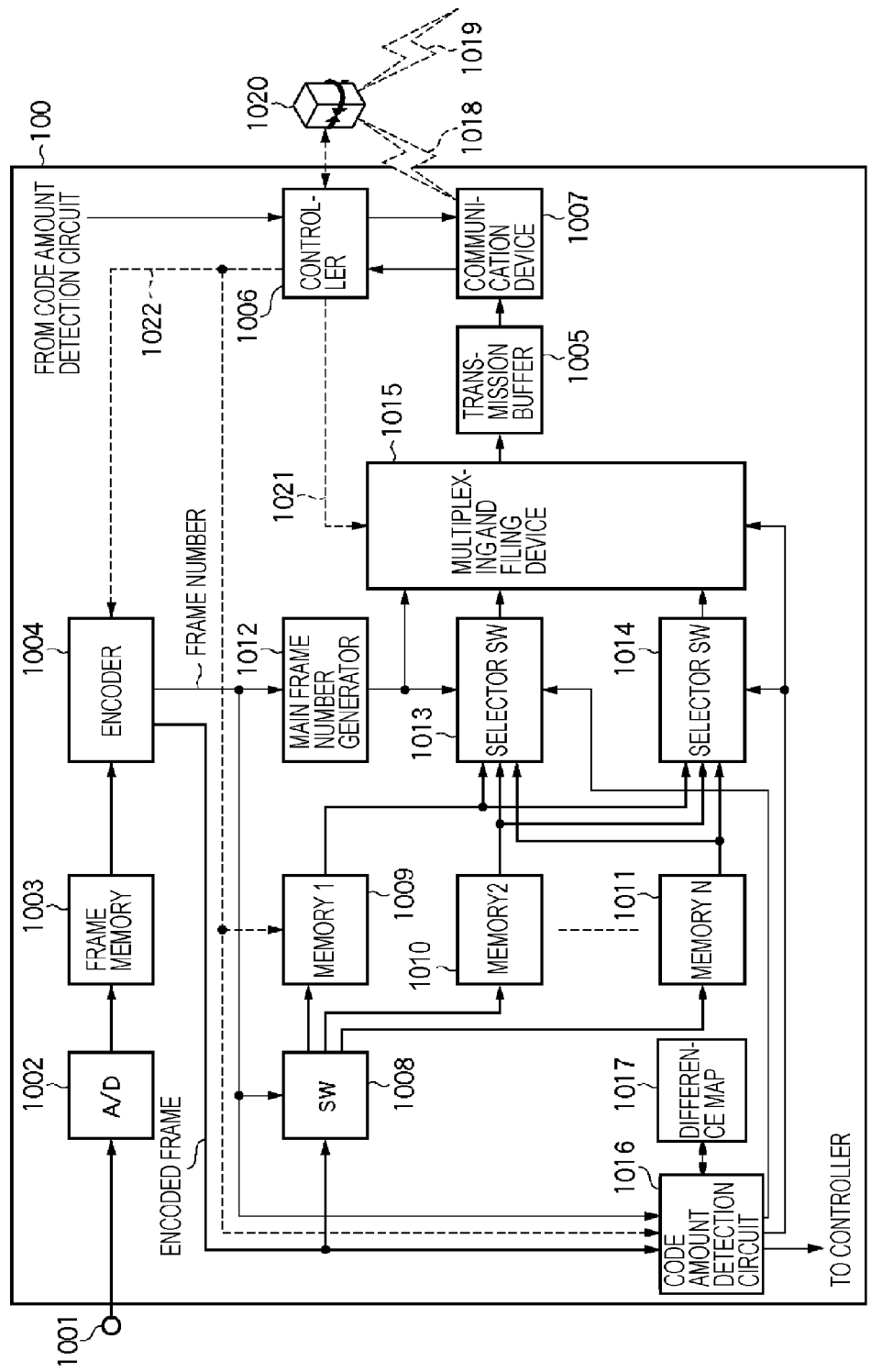
FIG. 1 is a block diagram showing an example of a configuration of an image encoding and transmission apparatus, which is an example of an information transmission apparatus according to a first embodiment of the present invention, and an example of a configuration of an information transmission system using the image encoding and transmission apparatus.

Embodiments of the present invention will be described with reference to the drawings.
First Embodiment
FIG. 1 is a block diagram showing an example of a configuration of an image encoding and transmission apparatus, which is an example of an information transmission apparatus according to a first embodiment of the present invention, and an example of a configuration of an information transmission system using the image encoding and transmission apparatus. That is, in the first embodiment, an information transmission apparatus that transmits image data as data whose generation amount per unit time changes will be described.

A moving image signal (analog original image) input to an input terminal 1001 of an image encoding and transmission apparatus 100 is converted into digital moving image data by an A/D converter 1002, and the digital moving image data is temporarily stored in a frame memory 1003. If digital moving image data is input to the input terminal 1001, the A/D converter 1002 can be bypassed or a configuration in which the A/D converter 1002 is deleted can be adopted.

The digital moving image data stored in the frame memory 1003 is read for each frame or the like, and the read digital moving image data is input to an encoder 1004. The encoder 1004 compresses and encodes the digital moving image data using a predetermined encoding method, and outputs the compressed and encoded digital moving image data as an encoded frame to a switch (SW) 1008 and a code amount detection circuit 1016. Image data may be encoded by the encoder 1004 in units of frames, slices, or macroblocks.

When outputting the encoded frame, the encoder 1004 also generates a frame number corresponding to the encoded frame, and at the same time, outputs the generated frame number to a main frame number generator 1012, the switch 1008, and the code amount detection circuit 1016.

In accordance with the frame number output from the encoder 1004, the switch 1008 selects one of N memories 1009 to 1011 for the encoded frame output from the encoder 1004. Thus, the encoded frame is stored in one of the memories 1009 to 1011.

The way in which the switch 1008 selects one of the memories 1 to N (1009 to 1011) is described next.

In the first embodiment, each of the memories 1009 to 1011 (memory numbers 1 to N) stores an encoded frame. That is, each of the memories 1 to N stores, as a memory data unit, data generated in a unit time (in this case, for a frame). If the frame number of the encoded frame output from the encoder 1004 is X, the memory number L in which the encoded frame is to be stored is equal to a value obtained by adding 1 to the remainder of (X/N). That is, the equation $L=(X \bmod N)+1$ is obtained.

Processing for generating a multiplexed file in the first embodiment will now be described with reference to the flowchart shown in FIG. 11. For the sake of easier explanation, in the descriptions below, the total number N of memories is set to 5. In this case, for example, when the frame number X corresponding to an encoded frame output from the encoder 1004 is 41, since the remainder of 41/5 is 1, the equation $L=1+1=2$ is obtained. Thus, the switch 1008 connects an output of the encoder 1004 to an input of the memory 2 (1100). Accordingly, the encoded frame whose frame number is 41 is stored in the memory 2.

The code amount detection circuit 1016 acquires from a controller 1006 a threshold T (or a transmission bit rate R) to be compared with a code amount generated in the encoder 1004 (step S101). In the first embodiment, the threshold T is an optimal code amount that is dynamically determined by the controller 1006, as described below. The code amount detection circuit 1016 calculates the code amount S of the received encoded frame, and compares the code amount S with the threshold T (step S103).

If it is determined in step S105 that the code amount S is smaller than or equal to the threshold T (that is, if the determination in step S105 is NO), the code amount detection circuit 1016 calculates a difference value (T-S) between the threshold T and the code amount S of the encoded frame. Then, in addition to the frame number corresponding to the encoded frame, the difference value is stored as a code amount margin in a difference map 1017 (step S113).

If it is determined in step S105 that the code amount S is larger than the threshold T (that is, if the determination in step S105 is YES), the code amount detection circuit 1016 outputs the frame number to a selector switch (SW) 1014 and a multiplexing and filing device 1015. At the same time, the frame number and an arbitrarily defined value (this value indicates that there is no coded amount margin) are stored in the difference map 1017. Then, as described below, processing for allocating a portion that exceeds the threshold T is performed (step S107).

For the sake of explanation, an encoded frame corresponding to the frame number 40 is stored in the memory 1, an encoded frame corresponding to the frame number 41 is stored in the memory 2, an encoded frame corresponding to the frame number 37 is stored in the memory 3, an encoded frame corresponding to the frame number 38 is stored in the memory 4, and an encoded frame corresponding to the frame number 39 is stored in the memory 5.

That is, the current (latest) frame is the encoded frame whose frame number is 41 and is stored in the memory 2.

When the frame number X (=41) corresponding to the latest encoded frame is input from the encoder 1004 to the main frame number generator 1012, a main frame number Xnext to be read next is calculated.

The oldest written encoded frame is to be read next. The main frame number Xnext is calculated using equation (1).

$$X\text{next} = (\text{frame number } X \text{ of the latest encoded frame}) - (N-1) \quad (1).$$

Thus, when the frame number X is 41 and the number N of memories is 5, the main frame number Xnext is 37. Thus, a memory in which an encoded frame whose frame number X is 37 is stored will be read next. As described above, since the memory number L is calculated using the equation L=(X mod N)+1, the memory 3 will be read next.

If the code amount detection circuit 1016 determines in step S105 that the code amount of the latest encoded frame, that is, the code amount S of the encoded frame corresponding to the frame number 41 is smaller than or equal to the threshold T (that is, if the determination in step S105 is NO), the code amount detection circuit 1016 causes a selector switch 1013 to select the memory 3 and causes the selector switch 1014 to output GND (that is, level 0). The code amount detection circuit 1016 also calculates the difference (T−S) as a code amount margin, and stores the code amount margin in association with the frame number 41 in the difference map 1017 (step S113).

The contents of the memory 3 output through the selector switch 1013, that is, the encoded frame corresponding to the frame number 37, is input to the multiplexing and filing device 1015.

Since the output from the selector switch 1014 is zero, only the encoded frame corresponding to the frame number 37, which is an output of the selector switch 1013 (that is, the contents of the memory 3), is supplied to the multiplexing and filing device 1015. The multiplexing and filing device 1015 performs filing (packing) of the encoded frame as media data in accordance with an International Organization for Standardization (ISO) file format, and the filed media data is temporarily stored in a transmission buffer 1005 (step S115).

If the code amount detection circuit 1016 determines in step S105 that the code amount S of the encoded frame corresponding to the frame number 41 is larger than the threshold T (that is, the determination in step S105 is YES), the code amount detection circuit 1016 performs allocation processing for multiplexing at least the code amount corresponding to the difference (S−T) with one or more preceding frames displayed prior to the encoded frame corresponding to the frame number 41 and for transmitting the multiplexed code amount (step S107).

Processing for segmentation and allocation of an encode frame whose code amount exceeds the threshold will now be descried.

The code amount detection circuit 1016 acquires the main frame number Xnext (in this case, 37) to be read next. The main frame number Xnext can be acquired by the code amount detection circuit 1016 in accordance with equation (1) or can be acquired from the main frame number generator 1012. Alternatively, the main frame number Xnext may be informed from the controller 1006.

The code amount detection circuit 1016 reads, in accordance with the acquired main frame number Xnext, code amount margins (MX) and frame numbers X for (N−1) frames from the difference map 1017 in the order of output. That is, in this case, since the main frame number is 37 and the value 4 is acquired from the equation N−1=4, the code amount margins of frames corresponding to the frame numbers 37 to 40 are read.

The relationship among a memory number, a frame number X, a code amount margin, and an output order is shown in the table below.

| Memory number | Frame number | Code amount margin | Output Order |
|---|---|---|---|
| 1 | 40 | M1 | 4 |
| 2 | 41 | — | 5 (Current frame) |
| 3 | 37 | M3 | 1 |
| 4 | 38 | M4 | 2 |
| 5 | 39 | M5 | 3 |

The code amount detection circuit 1016 also calculates the memory numbers L in which encoded frames corresponding to the frame numbers X that have code amount margins M1, M3, M4, and M5 stored in the difference map 1017.

The code amount detection circuit 1016 determines the amount of segmentation of the encoded frame corresponding to the frame number 41 whose code amount exceeds the threshold T. A method for segmenting an encoded frame and for performing allocation in the image encoding and transmission apparatus according to the first embodiment will be described with reference to FIGS. 2A to 2C. The code amount detection circuit 1016 performs processing of segmentation and allocation.

Figure 2A:
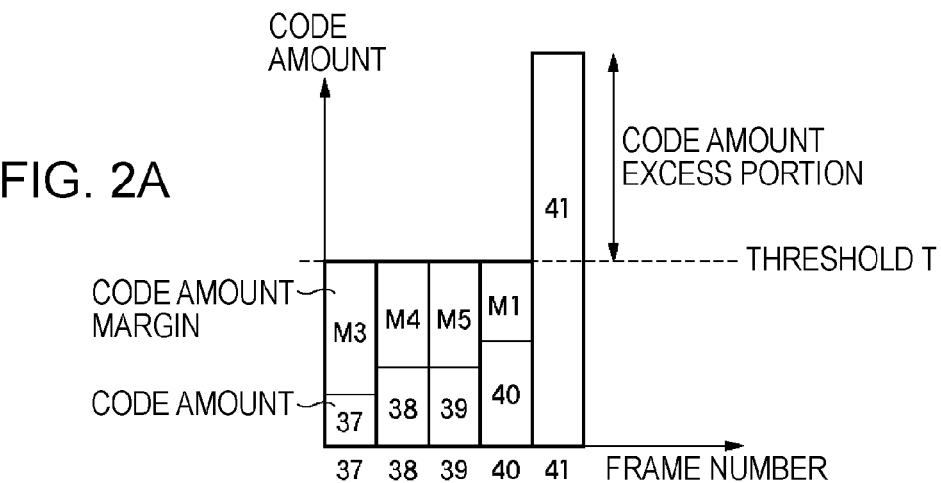
FIGS. 2A to 2C schematically show a method for segmentation and allocation of an encoded frame in the image encoding and transmission apparatus according to the first embodiment.

FIG. 2A schematically shows a state in which it is determined that the code amount S of the encoded frame corresponding to the frame number 41 exceeds the threshold T and the code amounts S of the preceding frames 37 to 40 do not reach the threshold T.

In this case, an excess data portion (that is, a portion of a piece of encoded data, the portion being of a data amount by which the piece of encoded data exceeds the threshold T) of the encoded frame corresponding to the frame number 41 whose code amount exceeds the threshold T is segmented in accordance with processing (1) to (3), and is allocated to preceding encoded frames.

(1) An excess data portion is segmented from the beginning, and a segment having size G1 (see a segment 2001 shown in FIG. 2B) is obtained. The size G1 is smaller than or equal to the code amount margin M3 of the encoded frame corresponding to the frame number 37. A segmentation point S1 is stored.

(2) If the code amount of the remaining encoded frame after the segmentation still exceeds the threshold T, the remaining excess data portion is segmented from the beginning (the segmentation point S1), and a segment having size G2 (see a segment 2002 shown in FIG. 2B) is obtained, as in processing (1). The size G2 is smaller than or equal to the code amount margin M4 of the encoded frame corresponding to the frame number 38. A segmentation point S2 is stored.

(3) Processing (1) and (2) are repeated until no excess data portion exists and the code amount of the encoded frame of the frame number 41 is smaller than or equal to the threshold T.

In general, segmentation points are set in units of slices or macroblocks constituting a frame. However, segmentation may be performed using other methods (for example, segmentation points may be set in units of bytes). Information on the segmentation points and information on the frames to which the code amounts are to be allocated are stored as segmentation information in, for example, an internal memory (step S109) and are reported to the controller 1006. Since the selector switches 1013 and 1014, memory reading processing, and filing processing are controlled using such segmentation information, a portion of encoded data of a frame whose code amount exceeds the threshold can be multiplexed when filing processing of a frame that has a code amount margin is performed.

As described above, in the example shown in FIGS. 2A and 2B, the encoded frame whose code amount S exceeds the threshold T is segmented into three segments 2001, 2002, and 2003. Then, the segment 2001, which is a part of the excess data portion, is multiplexed with the encoded frame corresponding to the frame number 37, and the segment 2002, which is another part of the excess data portion, is multiplexed with the encoded frame corresponding to the frame number 38. Accordingly, all the encoded frames corresponding to the frame numbers 37 to 41 can be transmitted such that each of the code amounts does not exceed the threshold T.

As described above, in the first embodiment, a code amount margin with respect to the threshold T is calculated and stored for each encoded frame. If an encoded frame whose code amount exceeds the threshold T is generated, an excess data portion of the encoded frame whose code amount exceeds the threshold T is segmented in accordance with the code amount margin of a preceding encoded frame to be read. Then, when the preceding encoded frame is transmitted, multiplication is performed and the multiplexed encoded frame is transmitted.

Thus, in a case where segmentation is performed as described with reference to FIGS. 2A and 2B, processing (I) and (II) is performed.

Figure 2B:
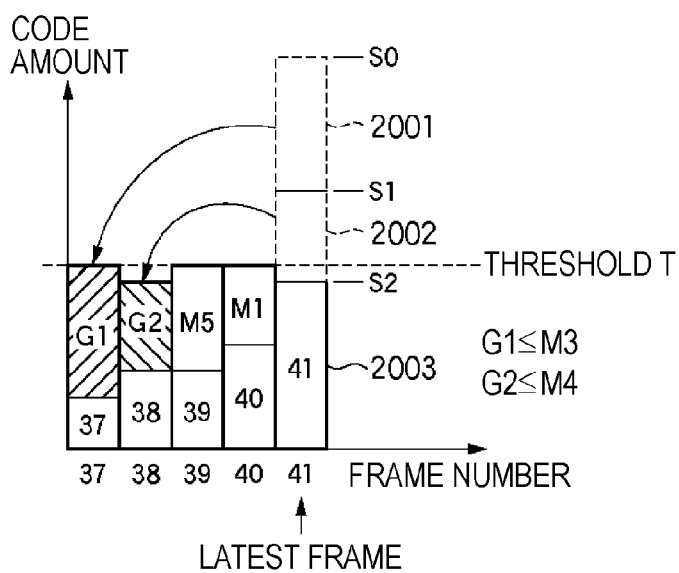

(I) When the main frame number Xnext is 37, the segment 2001 shown in FIG. 2B of the encoded frame corresponding to the frame number 41 is read from the memory 2, and is input to the multiplexing and filing device 1015 through the selector switch 1014. The encoded frame corresponding to the frame number 37 read from the memory 3 under the control of the controller 1006 is input to the multiplexing and filing device 1015 through the selector switch 1013. These encoded frames are multiplexed with each other and are converted into an ISO file by the multiplexing and filing device 1015 (step S111).

(II) When the main frame number Xnext is 38, the segment 2002 shown in FIG. 2B of the encoded frame corresponding to the frame number 41 is read from the memory 2, and is input to the multiplexing and filing device 1015 through the selector switch 1014. The encoded frame corresponding to the frame number 38 read from the memory 4 under the control of the controller 1006 is input to the multiplexing and filing device 1015 through the selector switch 1013. These encoded frames are multiplexed with each other and are converted into an ISO file by the multiplexing and filing device 1015. In parallel to this, the encoded frame corresponding to the frame number 42 is written to the memory 3 from which the encoded frame corresponding to the frame number 37 is read in processing (I).

The ISO file generated by the multiplexing and filing device 1015 is temporarily stored in the transmission buffer 1005, as described above.

The relationship among a memory number, a frame number X, a code amount margin, and an output order when the main frame number Xnext is 38 is shown in the table below.

| Memory number | Frame number | Code amount margin | Output Order |
|---|---|---|---|
| 1 | 40 | M1 | 3 |
| 2 | 41 | — | 4 |
| 3 | 42 | — | 5 (Current frame) |
| 4 | 38 | M4 | 1 |
| 5 | 39 | M5 | 2 |

Figure 2C:
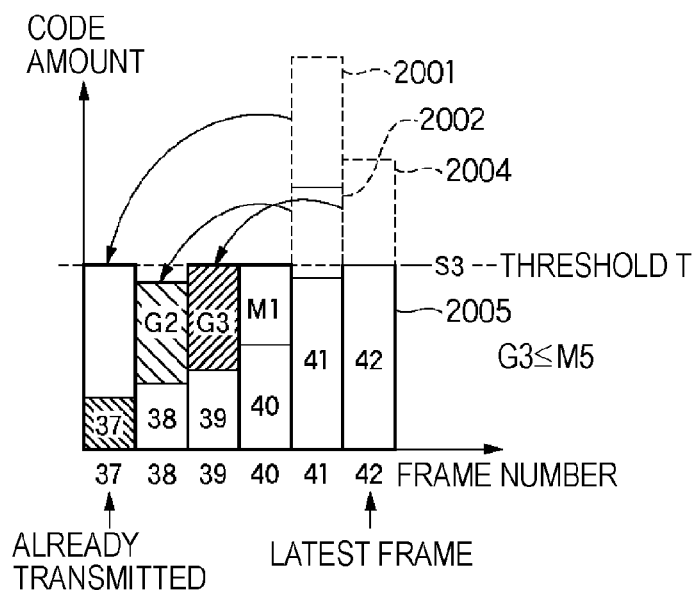

Here, for example, the code amount S of the encoded frame corresponding to the frame number 42 exceeds the threshold T, as shown in FIG. 2C.

In this case, the code amount detection circuit 1016 reads, in accordance with the acquired main frame number Xnext, the code amount margins (MX) and the frame numbers X for (N−2) frames from the difference map 1017 in the order of output. That is, in this case, since the main frame number Xnext is 38 and the value obtained from N−2 is 3, the code amount margins M4, M5, and M1 of the encoded frames corresponding to the frame numbers 38 to 40 are read.

The code amount detection circuit 1016 also calculates memory numbers L in which encoded frames corresponding to frame numbers X having the code amount margins M1, M4, and M5 that are stored in the difference map 1017 are stored.

Then, under the control of the controller 1006, the excess encoded data portion (excess data portion) of the encoded data of the encoded frame corresponding to the frame number 42 whose code amount exceeds the threshold T is segmented as described above, and the segmented excess data is allocated to a preceding encoded frame. Here, the code amount margin M4 corresponding to the frame number 38 has already been occupied by the encoded frame corresponding to the frame number 41. Thus, the excess data portion is segmented from the beginning, and a segment having size G3 (that is, a segment 2004 shown in FIG. 2C), which is smaller than or equal to the code amount margin M5 of the encoded frame corresponding to the frame number 39 is obtained. Then, a segmentation point S3 is stored. If the remaining code amount of the encoded frame corresponding to the frame number 42 after the segment 2004 is removed does not exceed the threshold T, segmentation is stopped. If the remaining code amount exceeds the threshold T, the above-mentioned processing is repeated until the remaining code amount does not exceed the threshold T.

As described above, in the image encoding and transmission apparatus according to the first embodiment, an encoded frame whose code amount exceeds the threshold T is segmented, and a segment having a size corresponding to a difference between the code amount of an encoded frame to which the encoded frame whose code amount exceeds the threshold is to be transmitted and the threshold is obtained. Thus, data having an amount close to the threshold can be transmitted, thus improving the use efficiency of transmission capacity.

For the sake of explanation, an apparatus including five memories (N=5), that is, memories for five frames, has been described as an example. The above-mentioned advantage of increasing the use efficiency of transmission capacity can be attained when a threshold is fixed. However, in the first embodiment, in order to best improve the use efficiency of a communication line, the threshold T is variable. Thus, a possibility in which code amounts of encoded frames consecutively exceed the threshold T is higher than a case where the threshold T is fixed.

Thus, in order to achieve reliable transmission processing while increasing the use efficiency of a line, it is desirable that the value of N (the total number of memories) be large to some extent. For example, when the encoder 1004 adopts an encoding method, such as a moving picture experts group (MPEG) 2 method, in which encoding is performed for a plurality of frames (a group of pictures (GOP)), it is desirable that the number of memories be equal to or larger than the number of frames (for example, fifteen or more) constituting a GOP.

The encoded frame group stored in the transmission buffer 1005 and packed into ISO file format is output to a communication device 1007 according to need under the control of the controller 1006.

The communication device 1007 refers to the received packet based on the ISO file format, and determines whether a transmission time stamp (ST) is described in a "User Data Box", which will be described below. If the transmission time stamp (ST) is described in the "User Data Box", the communication device 1007 outputs the packet based on the ISO file format to a communication line 1018 in accordance with the transmission time stamp (ST) (see FIG. 10B). In contrast, if the transmission time stamp (ST) is not described in the "User Data Box", the communication device 1007 calculates a transmission start time optimal for the packet and outputs the packet to the communication line 1018 in accordance with the calculated optimal transmission start time (see FIG. 1A). The transmission start time can be calculated in accordance with the data configuration of the packet (for example, a decoding start time (DT) of encoded data constituting the packet) and a transmission start time of the packet that was output immediately previously.

When the transmission time stamp (ST) is not described in the "User Data Box" and part of excess data of another encoded frame is multiplexed, two independent decoding start times (DT) exist within the packet. In this case, if the decoding start times (DT) are merely referred to, a transmission start time cannot be determined. For example, a transmission start time can be calculated such that the highest use efficiency of the communication line 1018 can be achieved in accordance with the earliest time of a plurality of decoding start times (DT) and a transmission start time of the packet that was output immediately previously.

The packet output to the communication line 1018 is transmitted to a receiver side via an access point 1020 and a communication line 1019.

When the multiplexing and filing device 1015 converts an encoded frame into an ISO file, the controller 1006 calculates the time at which transmission of the file starts, and outputs, as necessary, transmission start time information 1021 to the multiplexing and filing device 1015.

Figure 7:
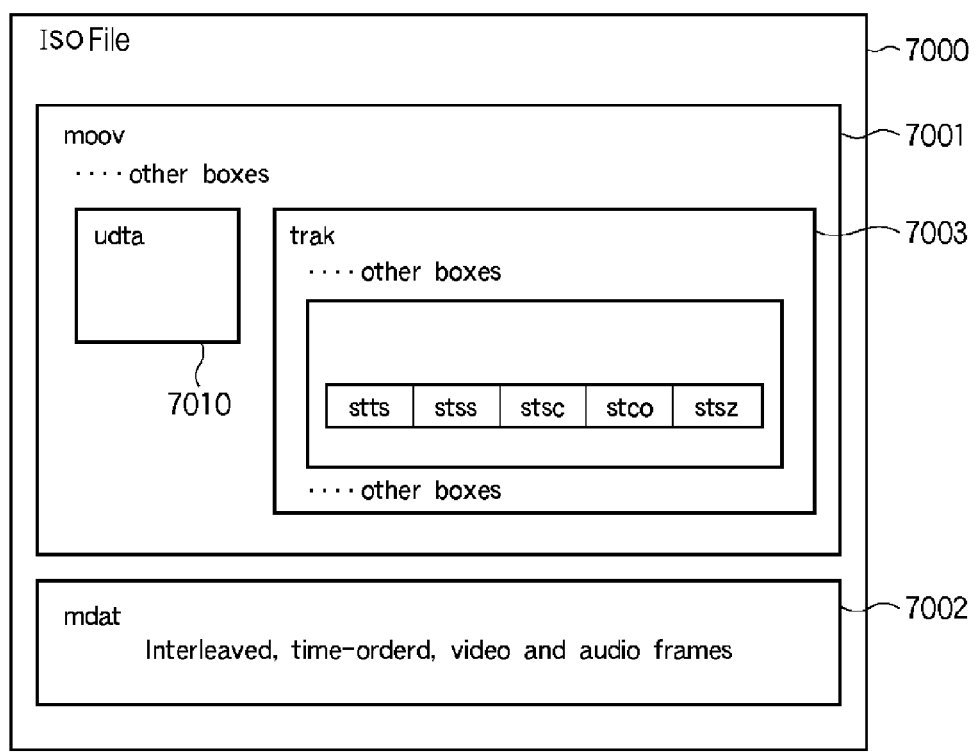
FIG. 7 is a simplified illustration of a data configuration of the ISO file format.

The multiplexing and filing device 1015 is capable of writing, as additional information, the transmission start time information received from the controller 1006 in a desired format in a "User Data Box" (Type=udta) denoted by reference numeral 7010 shown in FIG. 7 and outputting the transmission start time information as a packed ISO file.

The additional information that can be added by the multiplexing and filing device 1015 is not necessarily transmission start time information.

FIG. 6 shows a list of boxes defined by the ISO file format.

Referring to FIG. 6, six lines, the first to sixth lines from the left, represent the type of box defined by the ISO file format and the relation of inclusion. The rightmost line represents an explanation of the corresponding box.

"Type" represented using four bytes for identifying the type of a box is allocated to each of the boxes. Normally, "Type" is represented using four alphanumeric characters. "Type", which is represented using four alphanumeric characters, is described in the six leftmost lines. In the following descriptions, "Type" is used to represent a particular box.

The relationship in which a box includes another box is represented by the positional relationship of corresponding lines. A case where a box in a certain line includes a box on the right side is shown in FIG. 6. For example, a box "moov" on the second row from the top includes boxes "mvhd", "trak", "mvex", "udta", and the like.

FIG. 7 is a simplified illustration of a data configuration of the ISO file format.

As shown in FIG. 7, a normal box configuration based on the ISO file format includes a box (moov) 7001 for storing metadata of media data and a box (mdat) 7002 for storing actual media data. Media data is, for example, sample data of a moving image or sound. Metadata of media data is information, such as management information of a moving image or sound sample, of the media data.

A box (trak) 7003, which is a box corresponding to media data, is included in the box (moov) 7001. The media data within the box (mdat) 7002 is segmented into a set (chunk) of a plurality of samples of continuous moving images or sound. In a data field of the box (mdat) 7002, a chunk array is stored.

The size of the chunk and the number of samples contained in the chunk are not particularly limited. The size of the chunk and the number of samples contained in the chunk can be determined in accordance with the environment and conditions. The box (udta) 7010 corresponds to "udta" (User Data Box) in the box list shown in FIG. 6. According to the ISO file format, the box (udta) 7010 exists immediately below the box (moov) 7001.

The contents and format of the "User Data Box" (Type=udta) are ignored by a playback apparatus that is not defined by the International Organization for Standardization/International Electrotechnical Commission (ISO/IEC) specifications and that does not support the function of the "User Data Box". Thus, the existence of the box "udta" does not affect the operation of the playback apparatus that does not support the box (Type="udta").

As described above, in the multiplexing and filing device 1015, the contents of additional information stored in the "User Data Box" are not limited to transmission start time information, and any type of information can be stored in a desired format.

The controller 1006 also acquires specification information, such as a buffer capacity, data processing capability, and the like of a receiver, via the communication device 1007, and calculates the maximum bit rate at which processing can be performed, an allowable delay time for the bit rate, and the like. In addition, the controller 1006 detects an instantaneous value of the circuit capacity, and calculates the average circuit capacity for a defined period of time and a range of an instantaneous circuit capacity with respect to the calculated average circuit capacity. The controller 1006 calculates an optimal code amount W for a unit display time (for example, a code amount for each frame) using the acquired or calculated values as parameters, under the conditions in which the use efficiency of the circuit capacity is a predetermined value or more and processing of the receiver side is successfully performed. The controller 1006 outputs the calculated optimal code amount 1022 to the encoder 1004 and the code amount detection circuit 1016.

The encoder 1004 sets the target (upper limit) value of a generation code amount to the received optimal code amount 1022, and controls code amount.

The code amount detection circuit 1016 sets the threshold T, which is to be compared with the generation code amount in the encoder 1004 (see FIGS. 8A and 8B), to the optimal code amount (1022).

When the access point 1020 on a communication line supports a quality of service (QoS) function in IEEE 802.11e or the like, the controller 1006 is capable of requesting the access point 1020 to perform allocation of the circuit capacity. More specifically, the controller 1006 requests the access point 1020 to perform allocation of the circuit capacity in accordance with a necessary code amount U, which is a value (W+V) obtained by adding a prediction value of an overhead V when the multiplexing and filing device 1015 performs ISO filing to the above-described optimal code amount W. Then, the controller 1006 acquires an allocation value A of the circuit capacity from the access point 1020.

In this case, the controller 1006 outputs to the code amount detection circuit 1016 and the encoder 1004 the value (A-V), as the optimal code amount W, obtained by subtracting the overhead V generated when ISO filing is performed from the circuit capacity A allocated by the access point 1020.

If the receiver has a function to feed back information to the image encoding and transmission apparatus 100 using a function of reduced test package (RTP) control protocol (RTCP), real-time streaming protocol (RTSP), or the like, the controller 1006 is capable of receiving information from the receiver through the communication device 1007.

When receiving information on an error rate, a distribution stop request, or the like, the controller 1006 is capable of controlling encoding processing in response to a request from the receiver side by outputting to the encoder 1004 control information, such as an instruction to increase or decrease a code amount, to stop encoding processing, or the like.

As described above, according to the first embodiment, an excess data portion of encoded data of a frame whose code amount exceeds a threshold is multiplexed with encoded data of a preceding frame whose code amount does not reach the threshold, and the multiplexed encoded data is transmitted. Since the amount of excess encoded data to be multiplexed is increased or decreased in accordance with the difference between the code amount of the frame to be multiplexed with the excess encoded data and the threshold, the use efficiency of a line can be increased while a deterioration of image quality can be suppressed.

In addition, since the threshold is dynamically changed in accordance with the state of the line, even if transmission is performed using a line whose communication quality dynamically changes, a high use efficiency of the line can be achieved while overflow of a communication buffer is prevented.

In addition, since the ISO file format is adopted, the size of a transmission packet can be flexibly changed in accordance with the circumstances. In addition, as additional information for each packet, a packet transmission time can be embedded. Thus, a transmission server is capable of transmitting the packet in accordance with the transmission time provided as the additional information. Therefore, the burden imposed on the server to calculate the packet transmission time is reduced.

In addition, with the ISO file format, "Hinting" is available. Thus, if the receiver refers to the contents of "HintSampleEntr( )", the code amount of the subsequent frame can be predicted. Thus, prediction of overflow or underflow of a reception buffer of the receiver can be achieved.

In addition, when the receiver includes a unit to transmit a change request, if it is determined that overflow or underflow of a buffer may occur in accordance with the predicted code amount of the subsequent frame, the receiver is capable of transmitting a request to change the encoding rate (transmission bit rate) to a transmitter (encoder) side. If the controller 1006 controls the threshold T in response to the change request, a possibility of preventing a processing failure, such as overflow or underflow of the buffer in the receiver, can be increased.

Second Embodiment

A second embodiment will be described with reference to FIG. 3.

Although an example of an apparatus that encodes moving image data and that transmits the encoded moving image data is described in the first embodiment, an example of a moving image distribution system that distributes encoded moving image data will be described in the second embodiment. A data generation amount per unit time also changes in a case where encoded moving image data is read, as in the first embodiment. Thus, it should be easily understood that the present invention is also applicable to this case.

Figure 3:
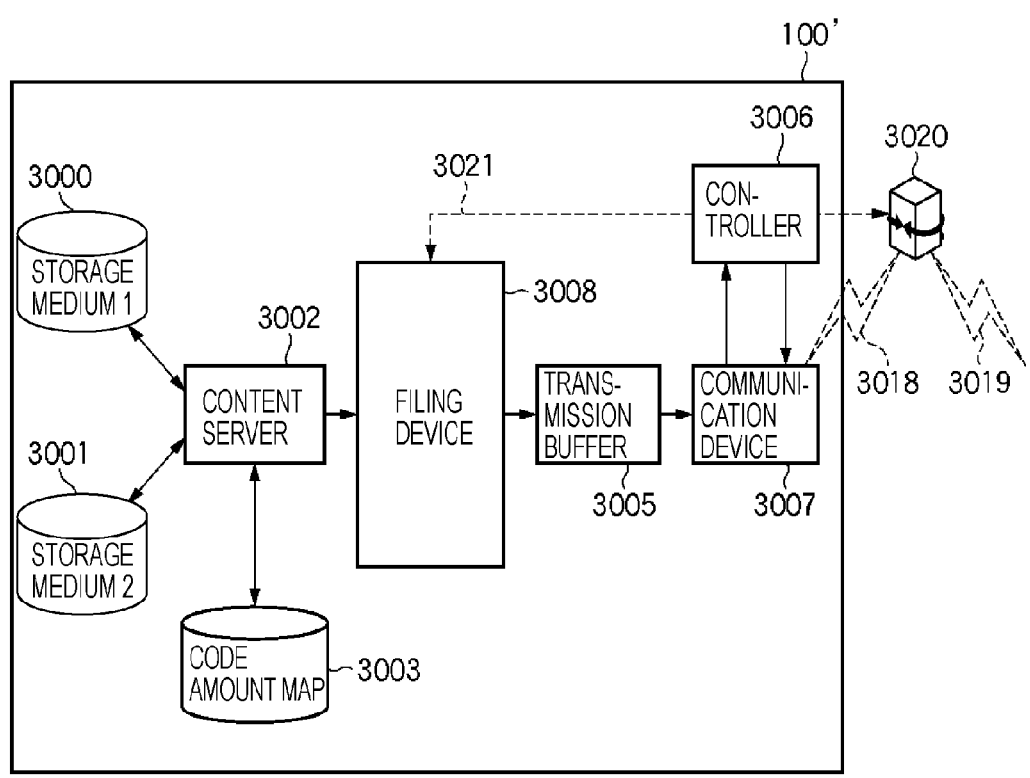
FIG. 3 is a block diagram showing an example of a configuration of a moving image distribution apparatus, which is an example of an information transmission apparatus according to a second embodiment of the present invention, and an example of a configuration of an information transmission system using the moving image distribution apparatus.
Figure 4:
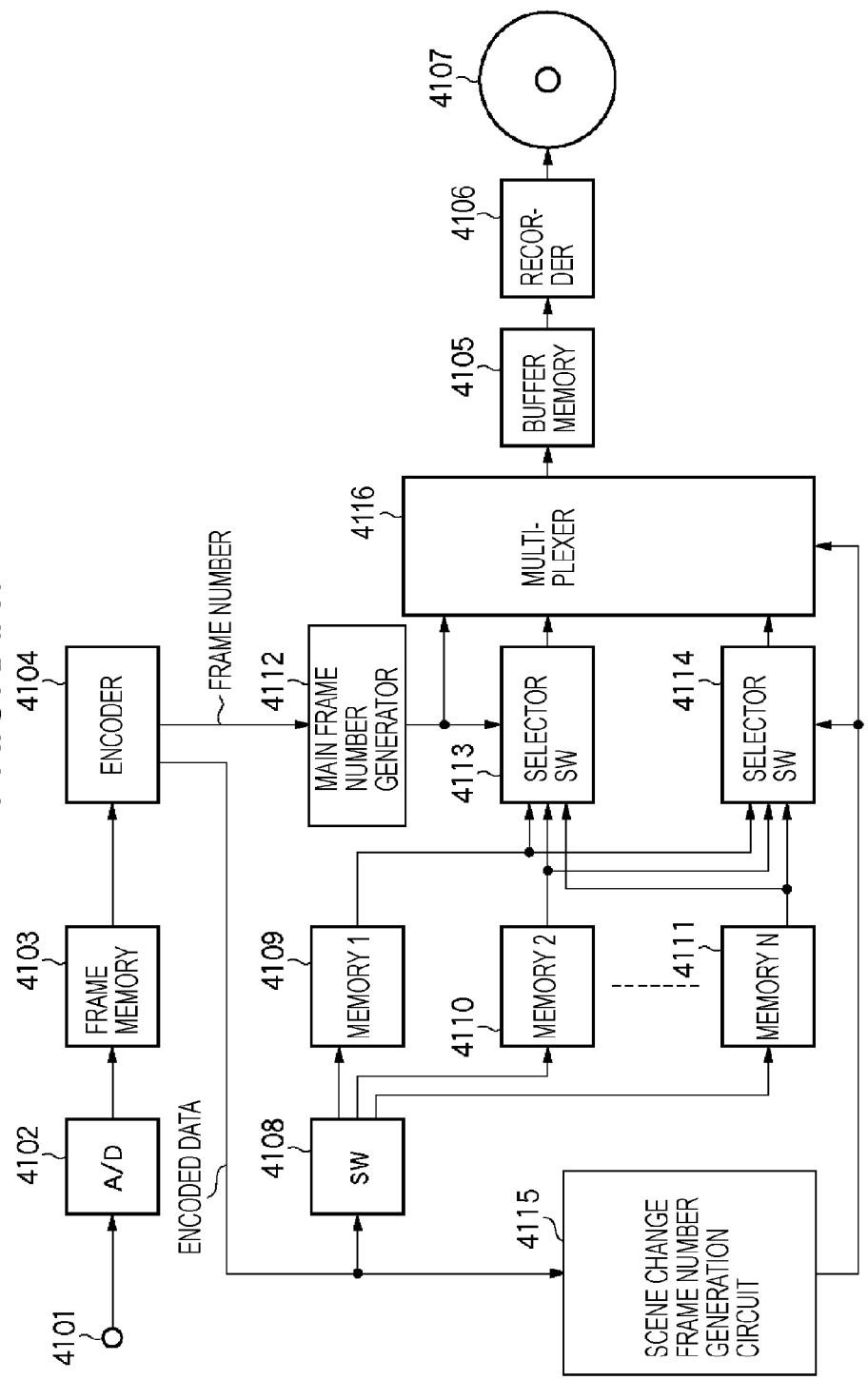
FIG. 4 is a block diagram showing an example of a configuration of an image data transfer apparatus of the related art.

FIG. 3 is a block diagram showing an example of a configuration of a moving image distribution apparatus 100', which is an example of an information transmission apparatus according to the second embodiment, and an example of a configuration of an information transmission system using the moving image distribution apparatus.

For example, a plurality of moving image contents that has already been encoded using a predetermined method is stored in a storage medium 1 (3000), such as a hard disk drive.

When the contents stored in the storage medium 1 (3000) are updated (added), a content server 3002 detects a code amount of the updated contents for each display time or for each frame, and generates a code amount map of the entire contents. The content server 3002 stores the code amount of content and information for identifying the content (for example, a content ID) in association with each other in a code amount map storage device 3003.

Figure 8A:
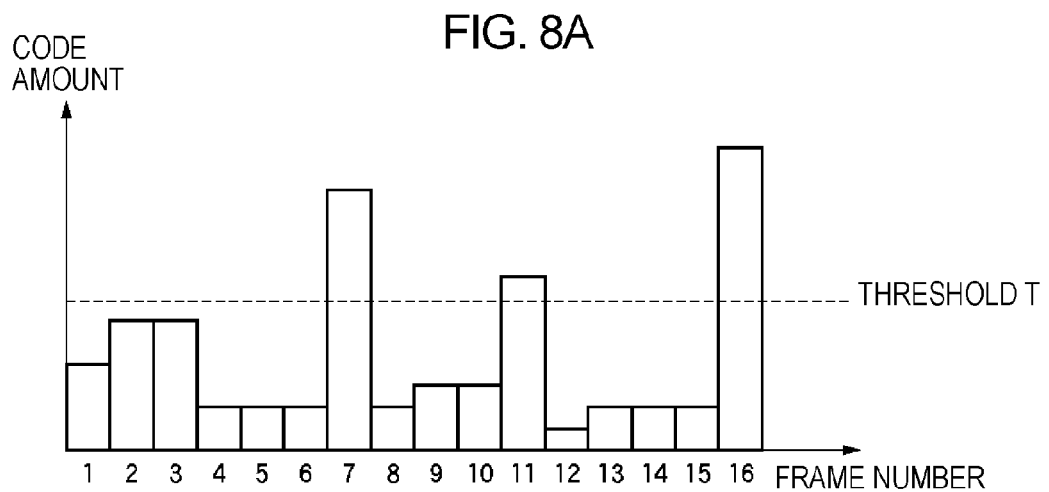
FIG. 8A shows an example of a code amount map used by the moving image distribution apparatus according to the second embodiment.

FIG. 8A schematically shows a code amount map generated in accordance with a code amount for each frame. In FIG. 8A, for easier understanding of a code amount, the map is represented by a bar chart. However, actually, a code amount for each frame is recorded as a numerical value.

When receiving a request from a receiver (not shown) to distribute contents, a controller 3006 calculates an optimal transmission bit rate R taking into consideration the circuit capacity ensured at the point in time and the capability of the receiver. The controller 3006 outputs a distribution start instruction, together with a content ID of the content that is requested to be distributed and the bit rate R, to the content server 3002.

When receiving the distribution start instruction, the content server 3002 reads a code amount map corresponding to the designated content ID from the code amount map storage device 3003. The content server 3002 calculates a code amount margin of each frame in accordance with the code amount of the corresponding frame and the calculated optimal transmission bit rate R, and detects a frame (excess frame) having a code amount that cannot be transmitted within a predetermined frame time at the bit rate R. The code amount margin can be calculated in any way. If display is performed at 30 frames per second, the bit rate per frame can be calculated by, for example, R (bits/second)/30 (frames/second]=R/30 (bits/frame).

An excess data portion of the frame that has an excess code amount with respect to the optimal transmission bit rate R is read from the storage medium 1 (3000), and the read excess data portion is temporarily stored in a storage medium 2 (3001). The temporarily stored encoded data has at least a code amount by which the code amount of the frame exceeds the bit rate R. For example, when a frame is temporarily stored in units of blocks, an amount that is larger than the amount corresponding to the real excess data portion may be temporarily stored. Thus, the frame that has an excess code amount may be segmented to obtain a segment having a size that is smaller than or equal to the code amount corresponding to the bit rate R.

Then, at least an excess data portion of the frame that has an excess code amount is segmented such that the code amount of the excess data portion does not exceed a corresponding code amount margin by referring to code amount margins of a plurality of preceding frames (the number of frames is not limited) in the order of display in the receiver. That is, the number of segments of the excess data portion that is temporarily stored in the storage medium 2 (3001), the segmentation ratio, and frames (frame numbers) with which multiplication is to be performed are determined such that the code amount of the excess frame and the code amount of each of the preceding frames do not exceed the code amount corresponding to the bit rate R. Then, the determined number of segments, segmentation ratio, and frame numbers of frames with which multiplication is performed are stored in the storage medium 2 (3001) in association with the excess data portion.

Figure 8B:
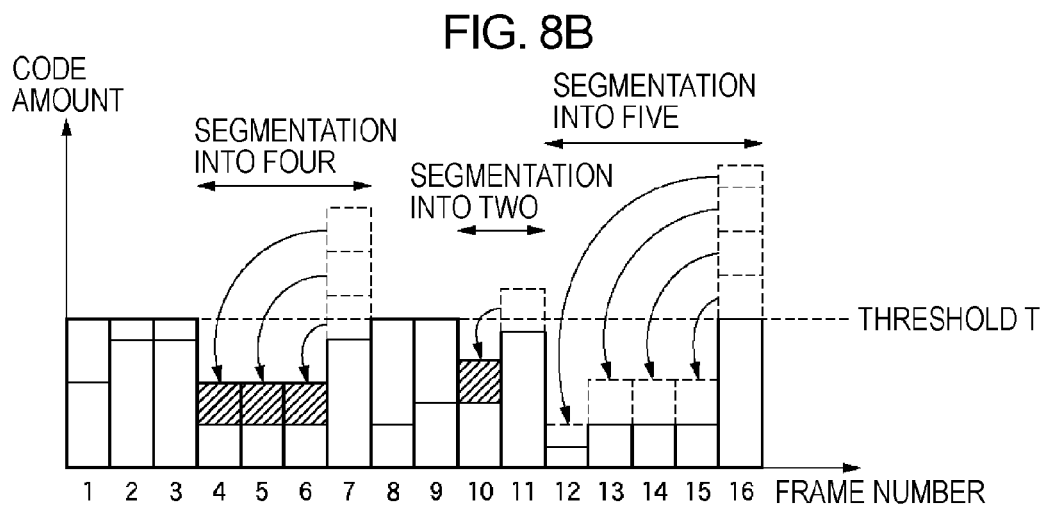
FIG. 8B shows an example of a method for allocating an excess code amount.

In FIGS. 8A and 8B, the code amount corresponding to the optimal transmission bit rate R is represented as a threshold T, as in the first embodiment. Referring to FIG. 8A, the frame number of the first appeared excess frame is 7. In this case, the content server 3002 reads code amount margins of the frames corresponding to the frame numbers 1 to 6, which precede the excess frame corresponding to the frame number 7. The code amount margins are arranged in a descending order relatively (in this case, for example, in the order of 4, 5, 6, 1, 2, and 3). The number of segments of the excess data portion and destinations of the multiplication are determined by comparing the code amount of the excess data portion with the code amount margins of the frames corresponding to the frame numbers, 4, 5, 6, 1, 2, and 3.

For example, if the number of segments is 3 (the code amount margins corresponding to the frame numbers 4, 5, and 6 are selected), at least the excess data portion is segmented into three segments whose sizes do not exceed the code amount margins corresponding to the selected frame numbers 4, 5, and 6. In the example shown in FIG. 8B, the excess data portion and another portion of the frame corresponding to the frame number 7 are segmented to obtain three segments having the same size. However, as shown by a frame corresponding to the frame number 16, segments do not necessarily have the same size. In the second embodiment, the number of segments of an excess data portion that is to be multiplexed with other encoded frames, a segmentation ratio, or the code amount (size) of each of the segments can be determined in a desired manner.

In the second embodiment, as described above, the excess data portion of the frame corresponding to the frame number 7 and information that is capable of identifying which part of the excess data portion is to be multiplexed with which frame are stored in the storage medium 2 (3001). More specifically, the frame number of a frame to be multiplexed and the combination of the start address of the storage medium 2 (3001) in which the excess data portion to be subjected to multiplication is stored and the data amount may be stored.

The content server 3002 performs above-described processing for all the frames of contents that are requested from the controller 3006 to be distributed. When the above-described processing is completed, distribution of the requested contents starts.

By this time, the entire excess data portion of the frame whose code amount exceeds the threshold T is moved from the storage medium 1 (3000) to the storage medium 2 (3001). Thus, the code amount of each frame of the contents that are requested to be distributed, which is stored in the storage medium 1 (3000), is smaller than or equal to the optimal transmission bit rate R.

When the distribution starts, frames of the contents that are requested to be distributed are read in a predetermined order and input to the content server 3002.

The content server 3002 monitors the frame number of a frame read from the storage medium 1 (3000). When a frame with which a segment of the excess data portion stored in the storage medium 2 (3001) is to be multiplexed is read from the storage medium 1 (3000), the corresponding segment is read from the storage medium 2 (3001). Then, the read encoded data are multiplexed (combined) with each other and output to a filing device 3008.

For example, the frame number 4 is read from the storage medium 1 (3000). In this case, at the same time, a segment of an excess data portion to be multiplexed with the encoded data corresponding to the frame number 4 is read from the storage medium 2 (3001). The content server 3002 multiplexes the read segment of the excess data portion with the encoded data corresponding to the frame number 4 and inputs the multiplexed encoded data to the filing device 3008.

Similarly, when the frame number 5 is read, a segment of an excess data portion to be multiplexed with the encoded data corresponding to the frame number 5 is read from the storage medium 2 (3001) at the same time. The content server 3002 multiplexes the read segment of the excess data portion with the encoded data corresponding to the frame number 5 and inputs the multiplexed encoded data to the filing device 3008.

Such reading processing may be performed under the self-control of the content server 3002 or under the control of the controller 3006.

If a communication circuit in which a constant circuit capacity is maintained and an error rarely occurs is used, the above-mentioned segmentation processing based on a circuit capacity set at the reception of a distribution request is not necessarily performed. In this case, since the circuit capacity is regarded as not being changed, segmentation processing can be performed in advance by assuming a constant circuit capacity (bit rate) Rt. Thus, immediately after a distribution request is received, encoded frames are sequentially read from the storage medium 1 (3000), and excess data portions of encoded data are sequentially read in accordance with the contents stored in the storage medium 2 (3001). Thus, distribution can be started immediately.

Figure 9A:
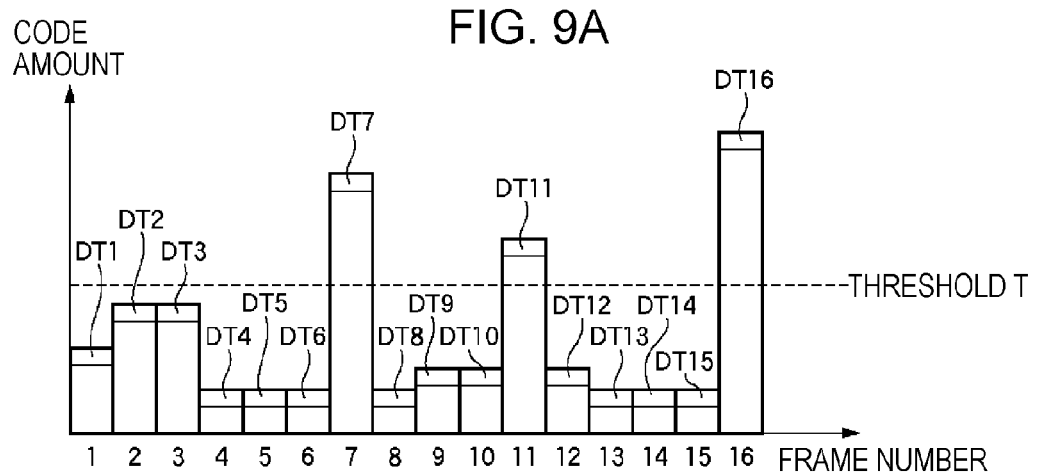
FIGS. 9A and 9B show examples of a state in which information on decoding start time is added to each encoded frame shown in the examples shown in FIGS. 8A and 8B.
Figure 9B:
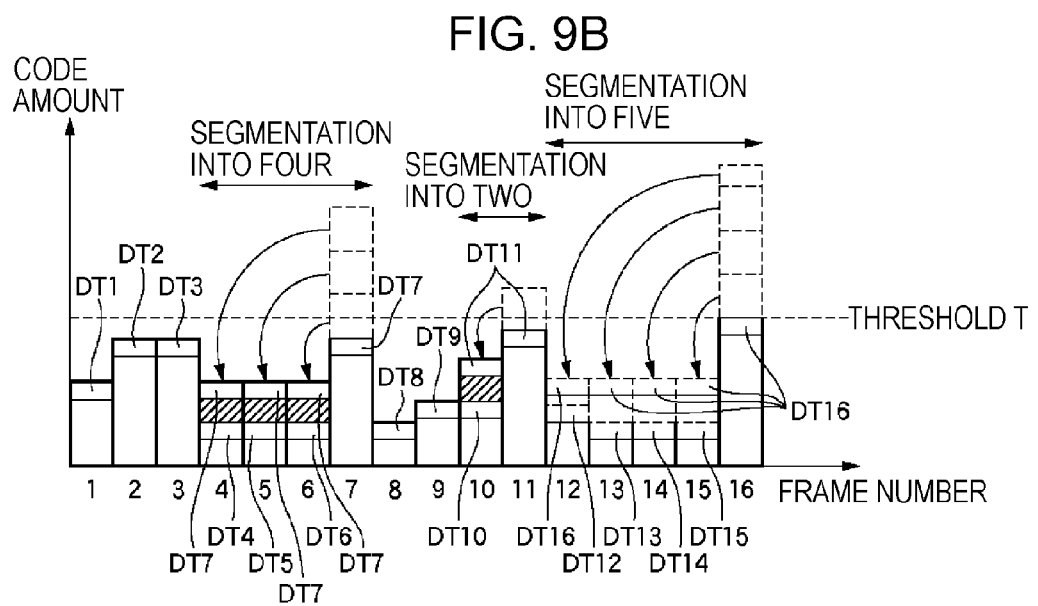

As shown in FIGS. 9A and 9B, decoding time stamp (DT) representing the time at which decoding of an encoded frame starts is added to the corresponding encoded frame in the receiver. The encoded frame input from the storage medium 1 (3000) to the content server 3002 is multiplexed with part of a code amount (that is, a segment of an excess data portion) of the subsequent frame and information on the frame number, the decoding start time (DT), and the display start time (CT), according to need, and input to the filing device 3008.

The frames 1 and 4 shown in FIG. 9B will be explained. An excess data portion of the subsequent frame is not allocated to the frame 1, which is constituted by only data having a single decoding time stamp (DT). Thus, the filing device 3008 generates a file (a packet) in the ISO file format from only encoded data of the frame 1, as represented by reference numeral 10001 shown in FIG. 1A. In contrast, part of the code amount of the frame 7 whose code amount exceeds the threshold T is allocated to the frame 4. Thus, as represented by reference numeral 10002 shown in FIG. 1A, a packet is generated from the multiplexed data constituted by the encoded data of the frame 4 and the part of the encoded data of the frame 7. Thus, a plurality of decoding start times (DT) is included in the packet generated from the multiplexed data.

Encoded data packed (filed) in the ISO file format in the filing device 3008 is temporarily stored in a transmission buffer 3005.

As in the first embodiment, when the encoded frame is input to the filing device 3008, the controller 3006 is capable of predicting the time at which the encoded frame packed (packetized) into the ISO file format is to be transmitted from the communication device 3007. The predicted time can be stored as a transmission time stamp (ST) in the "User Data Box" in the ISO file format (see reference numeral 7010 shown in FIG. 7). FIG. 10B shows an example in which the transmission time stamp (ST) is stored.

The packets (encoded contents) temporarily stored in the transmission buffer 3005 are read as necessary under the control of the controller 3006 and input to the communication device 3007.

If the transmission time stamp (ST) is described in the "User Data Box" of each packet, the packet is output to a communication channel 3018 in accordance with the time designated by the transmission time stamp (ST).

In contrast, if the transmission time stamp (ST) is not described in the "User Data Box" of each packet, the controller 3006 calculates the time at which the packet is output to the communication channel 3018, and the controller 3006 outputs the packet to the communication channel 3018 in accordance with the calculated time. This time can be calculated in accordance with, for example, the free area of the transmission buffer 3005, the state of the communication channel 3018, the time at which the immediately preceding packet was output, and the like.

The packet output to the communication channel 3018 is distributed to a receiver (not shown) via the access point 3020 and a communication channel 3019.

As described above, according to the second embodiment, even in a case where stored encoded moving image data is transmitted, an advantage similar to the first embodiment can be achieved.

Other Embodiments

The foregoing embodiments can be implemented in terms of software by a computer (or a central processing unit (CPU), a microprocessing unit (MPU), or the like) of a system or an apparatus.

Thus, in order to cause the computer to implement the foregoing embodiments, a computer program supplied to the computer also implements an aspect of the present invention. That is, a computer program for attaining functions of the foregoing embodiments is included in the present invention.

Any type of program may be used as the computer program that attains the foregoing embodiments as long as it can be read by the computer. For example, object code, a program to be executed by an interpreter, or script data to be supplied to an operating system (OS) may be used. However, the type of computer program is not limited to the above examples.

The computer program to attain the foregoing embodiments is supplied to the computer via a storage medium, wired communication, or wireless communication. The storage medium for supplying the program may be, for example, a flexible disk, a hard disk, a magnetic storage medium, such as a magnetic tape, an optical or magneto-optical storage medium, such as an MO, a compact disc (CD), or a digital versatile disc (DVD), or a nonvolatile semiconductor memory.

As a method for supplying a computer program using wired or wireless communication, a method using a server of a computer network is available. In this case, a data file (program file) that may serve as a computer program constituting an aspect of the present invention is stored in a server. The program file may be in an executable form or may be source code.

The program file is supplied to the client computer that accesses the server by downloading the program file. In this case, the program file may be segmented into a plurality of segment files and the segment files can be distributed to different servers.

That is, a server apparatus that provides the client computer with the program file to attain the foregoing embodiments is also included in the present invention.

A computer program to attain the foregoing embodiments may be encoded and stored in a storage medium, and may be distributed to users. Key information for decoding the encoded program may be supplied to only a user who satisfies predetermined conditions and the computer program can be installed on a computer owned by the user. The key information can be supplied, for example, by downloading from a homepage via the Internet.

In addition, the computer program to attain the foregoing embodiments may use a function of the OS running on the computer.

In addition, part of the computer program to attain the foregoing embodiments may be formed by firmware, such as an expansion board or the like installed in the computer or may be executed by a CPU included in the expansion board.

In other words, the foregoing description of the embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-111360 filed Apr. 13, 2006, which is hereby incorporated by reference herein in its entirety.

What is claimed is:

1. An information transmission apparatus that transmits data, comprising:
a first memory unit configured to store first data corresponding to first frame data;

a second memory unit configured to store second data corresponding to second frame data which is to be reproduced after the first frame data;

a determination unit configured to determine, based on a first amount of data that the first memory unit can afford to store without exceeding a threshold, a first part of the second data which is distributed from the second memory unit to the first memory unit;

a distribution unit configured to distribute the first part of the second data to the first memory unit, when a second amount of the second data stored in the second memory unit exceeds the threshold; and a transmission unit configured to transmit, before transmitting a second part of the second data which is not distributed from the second memory unit to one or more other memory units, the first part of the second data distributed and stored in the first memory unit and the first data stored in the first memory unit.

2. An apparatus according to claim 1, further comprising:

a detection unit configured to detect the quality of a transmission channel through which the transmission unit performs transmission; and a threshold determination unit configured to determine the threshold in accordance with the detected quality.

3. An apparatus according to claim 1, further comprising:

a request unit configured to request an external apparatus that allocates a band of a transmission channel through which the transmission unit performs transmission to allocate a band necessary for communication of a data amount corresponding to the threshold.

4. An apparatus according to claim 1, further comprising:

a generation unit configured to convert the first part of the second data and the first data into a first file and to convert the second part of the second data into a second file, and to store the converted files in a transmission buffer, wherein the transmission unit is configured to read the files from the transmission buffer and to transmit the read file.

5. An apparatus according to claim 4, wherein the file generation unit is configured to provide the first file with first information indicating a transmission time of the first data and second information indicating transmission time of the second data.

6. An apparatus according to claim 1, wherein the fist data and the second data are image data encoded in units of frames, slices, or macroblocks.

7. An apparatus according to claim 1, further comprising:

a generation unit configured to generate a first data unit from the first part of the second data and the first data and generate a second data unit from the second part of the second data, wherein the transmission unit transmits the first data unit before the second data unit.

8. An apparatus according to claim 1, further comprising:

a third memory unit configured to store third data corresponding to third frame data which is to be reproduced between the first frame data and the second frame data, wherein the transmission unit is configured to transmit, before transmitting the third frame data, the first part of the second data distributed and stored in the first memory unit and the first data stored in the first memory unit.

9. An information transmission method for transmitting data, comprising the steps of:

storing, in a first memory unit, first data corresponding to first frame data;

storing, in a second memory unit, second data corresponding to second frame data which is to be reproduced after the first frame data;

determining, based on a first amount of data that the first memory unit can afford to store without exceeding a threshold, a first part of the second data which is distributed from the second memory unit to the first memory unit;

distributing the first part of the second data to the first memory unit, when a second amount of the second data stored in the second memory unit exceeds the threshold; and transmitting, before transmitting a second part of the second data which is not distributed from the second memory unit to one or more other memory units, the first part of the second data distributed and stored in the first memory unit and the first data stored in the first memory unit.

10. A method according to claim 9, further comprising:

generating a first data unit from the first part of the second data and the first data; and generating a second data unit from the second part of the second data, wherein the first data unit is transmitted before the second data unit.

11. A method according to claim 9, further comprising:

storing, in a third memory unit, third data corresponding to third frame data which is to be reproduced between the first frame data and the second frame data, wherein, before the third frame data is transmitted, the first part of the second data distributed and stored in the first memory unit and the first data stored in the first memory unit are transmitted.

12. A non-transitory computer-readable storage medium storing a control program, which when loaded into a computer and executed performs an information transmission method for transmitting data, the information processing method comprising:

storing, in a first memory unit, first data corresponding to first frame data;

storing, in a second memory unit, second data corresponding to second frame data which is to be reproduced after the first frame data;

determining, based on a first amount of data that the first memory unit can afford to store without exceeding a threshold, a first part of the second data which is distributed from the second memory unit to the first memory unit;

distributing the first part of the second data to the first memory unit, when a second amount of the second data stored in the second memory unit exceeds the threshold; and transmitting, before transmitting a second part of the second data which is not distributed from the second memory unit to one or more other memory units, the first part of the second data distributed and stored in the first memory unit and the first data stored in the first memory unit.

13. A storage medium according to claim 12, the information processing method further comprising:

generating a first data unit from the first part of the second data and the first data; and generating a second data unit from the second part of the second data, wherein the first data unit is transmitted before the second data unit.

14. A storage medium according to claim 12, the information processing method further comprising:
   storing, in a third memory unit, third data corresponding to third frame data which is to be reproduced between the first frame data and the second frame data,
   wherein, before the third frame data is transmitted, the first part of the second data distributed and stored in the first memory unit and the first data stored in the first memory unit are transmitted.

* * * * *